July 16, 1968     R. P. FRITSCH ET AL     3,392,962
APPARATUS FOR THE PRODUCTION OF THERMOPLASTIC
MIXTURES BY CONTINUOUS HOMOGENISATION THEREOF
Filed Feb. 28, 1967     3 Sheets-Sheet 1
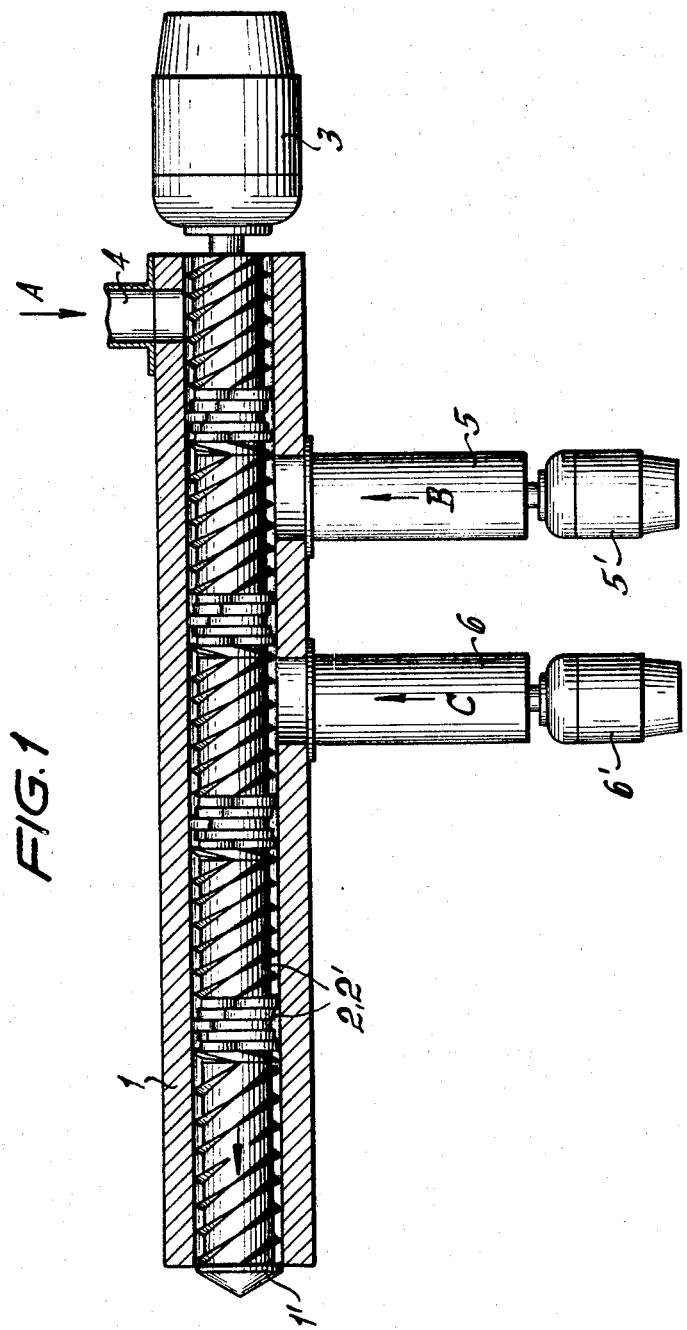
INVENTORS
Rudolf Paul FRITSCH
Hartwig H.O. KÜHNER
By Steinberg & Blake
Attorneys

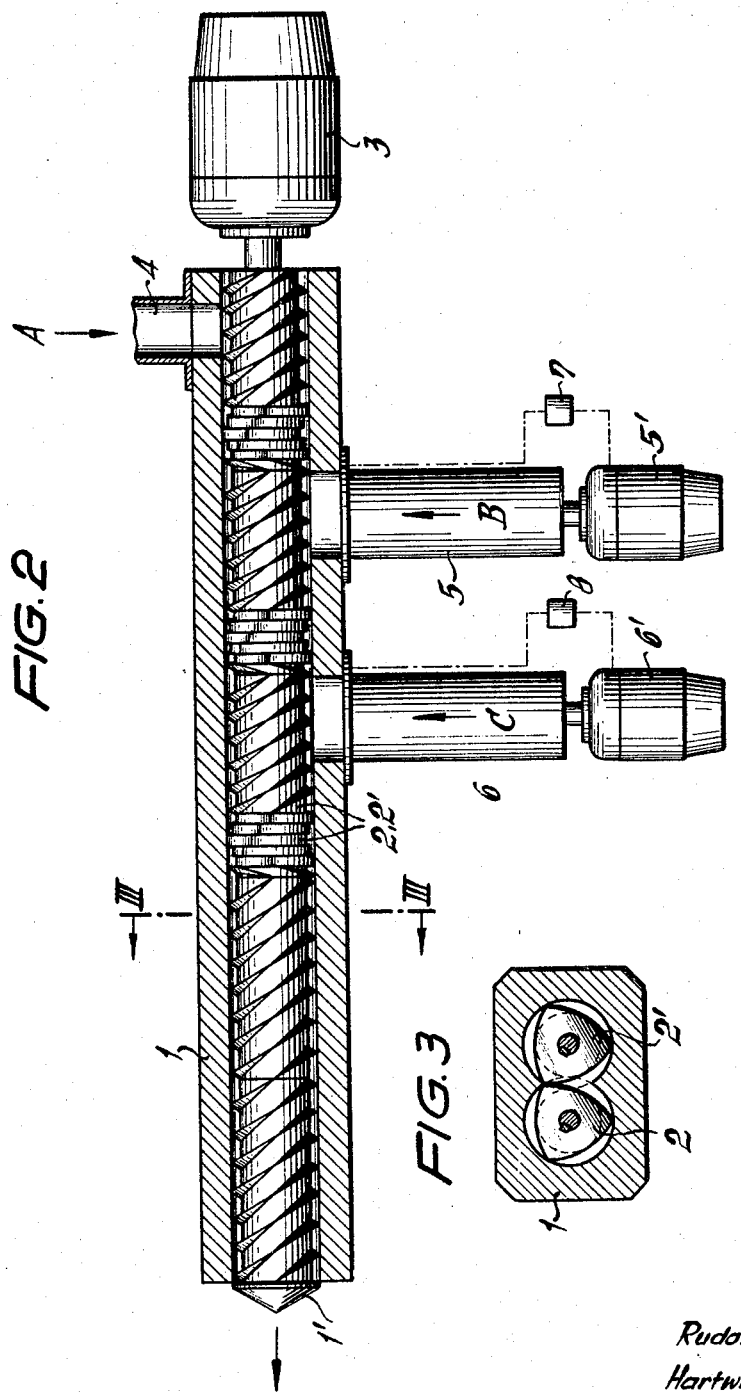

INVENTORS
Rudolf Paul FRITSCH
Hartwig H.O. KÜHNER

BY: Steinberg + Blake
Attorneys

United States Patent Office 3,392,962
Patented July 16, 1968

3,392,962
APPARATUS FOR THE PRODUCTION OF THERMOPLASTIC MIXTURES BY CONTINUOUS HOMOGENISATION THEREOF
Rudolf Paul Fritsch, Stuttgart-Weilimdorf, and Hartwig H. O. Kühner, Stuttgart-Degerloch, Germany, assignors to Werner & Pfleiderer, Baden-Wurttemberg, Germany
Filed Feb. 28, 1967, Ser. No. 619,416
Claims priority, application Germany, Mar. 26, 1966, W 41,229
2 Claims. (Cl. 259—9)

ABSTRACT OF THE DISCLOSURE

An apparatus for the production of thermoplastic mixtures by continuous homogenisation of a plurality mixture components in a plurality of treatment sections along a treatment zone, at least one component of which requires shearing forces.

The invention concerns an apparatus for producing thermoplastic mixtures by the continuous homogenisation of the components in coherent treatment sections, at least one of the components requiring a shearing force.

When producing polyethylene, more particularly high pressure polyethylene used for purposes such as packaging and the like, it is necessary that the end product, such as a foil, is highly glossy, contains no turbidity and, moreover, is free of any inclusions or other components impairing the above properties. This requirement is unobtainable satisfactorily by hitherto known methods since many starting mixtures or mixture components have inclusions or components which require a shearing force, which, during mixing or homogenizing, have to be completely dissolved to permit the above properties to be attained.

Since the shearing force requiring components of such mixtures have properties which permit them to be processed i.e. ground into minute particles only at a certain state of viscosity of the mixture, it is necessary to supply a suitable apparatus capable of providing a high energy source. It is, however, difficult to operate in the viscosity and temperature range in which the optimum effect with respect to the dissolution of the components requiring shearing force is obtained, due to the fact that the energy for suitable components can be effectively introduced only if the mixture possesses a certain degree or state of viscosity. This state is largely dependent upon temperature, so that apparati for processing polyethylene, especially high pressure polyethylene, have to be cooled accordingly. Thus, the installed output frequently cannot be utilized to the full extent to ensure a considerable expenditure of energy. Similarly, it is known that natural limits are set, with regard to the cooling of the installation, so that in any case, despite suitable cooling performances, neither a full utilisation of corresponding installations is ensured nor is the end product free from the defect commonly called "fish eyes." These "fish eyes" cause undesired thickened portions in the end products, particularly in foils for packaging purposes, and also have an adverse effect on any possible further processing of such mixtures.

An object of the invention is to provide an apparatus for producing thermoplastics mixtures by continuously homogenising several mixture components, whereby the disadvantages stated above have been reliably eliminated, thus, ensuring a complete exploitation of the installed output, and an end product free from defects such as "fish eyes," and conforming with the requirements of the quality of the end product with regard to gloss, freedom from turbidity and maximum uniformity.

According to the present invention, there is provided an apparatus for producing thermoplastic mixtures by continuous homogenisation of a plurality of mixture components and the provision of shearing forces, a plurality of treatment sections along a treatment zone, where at least one of the mixture components requires shearing forces, one or more components of the mixture being closed separately into the treatment sections, at different points along the zone wherein the temperature of the mixture rises to a given limit value in several stages due to the existence of the shearing forces, and thereafter, by addition of a further dose of mixture component having a low initial temperature, brought to a temperature established for the subsequent stage.

Also according to the present invention there is provided an apparatus for producing thermoplastic mixtures, having at least two driven kneading or mixing members arranged within a common housing, in which the housing has charging sockets provided with means for delivering proportioned doses of the various components to a treatment zone, the spacing of the sockets from one another being dependent upon the final thermoplastic mixture required.

The overall treatment zone is divided into several individual sections. At the end of each section, when the mixture reaches a given limiting temperature, a further dose of a mixture component is added at a low admission temperature. The mixture to be treated is thus again brought to a favourable state for introducing shearing forces which ensures the decomposition of further shearing force requiring components.

Dependent upon the strength and/or number of shearing force requiring inclusions or components, the scope of the invention hence permits the charging of the treatment sections in spatially successive stages, of several doses of several mixture components in random order of magnitude and also the size of the treatment sections to be selected in accordance with a set limiting temperature value. Thus, the process could for example be that in each dose of mixture component in one treatment batch requiring shearing forces differs from the others introduced over the whole treatment zone. The doses charged in the treatment section may thus be dependent upon the type and number of components requiring shearing force may be unequal in size and within the installments over the whole treatment zone.

In accordance with the invention, the doses of the individual mixture components charged in the individual treatment sections may also differ from one another with regard to progressive treatment in any given treatment section, a certain temperature limit value is set. Control of these limiting temperature values may thus be effected by known means, which, if necessary, may also be used simultaneously for the purpose of quantitively proportioning the mixture dosages charged in a specific treatment section. This ensures that the temperature in a treatment section does not rise above the predetermined limiting value and also ensures that the most favourable conditions for the further processing of the mixture, particularly with respect to the decomposition of components requiring shearing force, are provided. This is achieved by virtue of the fact that the mixture in a given treatment section cools down upon the addition of further mixture components.

Dependent upon the kind of mixture components to be treated, and upon the number and hardness of the components requiring shearing force, it is advisable to effect a suitable adaptation of the invention. Thus, it is readily possible that the individual doses of mixture components bears an inverse relationship to the magnitude of the component introduced over the whole treatment zone. This, for example, would signify that in the first treatment section, the mixture component having the highest proportion of components requiring shearing force is enlarged, whilst in the subsequent treatment sections larger quantities are charged with diminishing proportions of components requiring shearing force, so that, in the last charging stage, the mixture component having the lowest proportion of components requiring shearing force is charged. This method of operation has the advantage that the performance of the installed machine can be fully utilized, because the introduced energy in every treatment stage serves both for the decomposition of the components requiring shearing force and the throughput of the whole mixture. Thus, for the throughput of the substantially viscous mixture, only a low energy requirement is necessary, whilst the bulk of the energy is required for the decomposition of the components requiring shearing force. This however, as repeatedly mentioned, can become fully effective only if the mixture is in a most suitable state for decomposing the components requiring shearing force.

The method in this case ensures that an economisation is obtained with regard to cooling due to the fact that the mixture contained within the treatment section is cooled down by a further addition of a mixture component having a lower initial temperature, thus ensuring that further processing achieves the optimum effect. In practice, this means that for a predetermined throughput quantity, a device of substantially lower performance has to be installed, or a device already installed may be used for the throughput of substantially greater mixture quantities than was hitherto the case, since large cooling outputs were required in order to cool the mixture components charged in a particular stage so as to ensure that an optimum proportion of components requiring shearing force could be decomposed.

In order to carry out the method, the housing is preferably divided into a plurality of adjacent treatment sections having a charging socket at the upstream end thereof, through which is charged, in a predetermined quantity, each mixture component. It is thus advisable that at least one temperature measuring member is provided in each section by means of which the momentarily supplied quantity of a predetermined mixture component is controlled, the quantity of which may possibly be dependant upon the temperature of this mixture component.

The possibilities for controlling the proportioning devices or the charging of the respective mixture components in each treatment section may be modified in a manifold manner, and will be dependant upon the method and arrangement of the whole apparatus and the given mixture to be treated.

The invention will now be described further, by way of example with reference to the accompanying drawings, in which:

FIG. 1 is a schematic partial section of an apparatus constructed in accordance with the invention;

FIG. 2 is a similar arrangement to the one shown in FIG. 1 of another form of apparatus;

FIG. 3 is a section on the line III—III of FIG. 2; and

Figure 4:
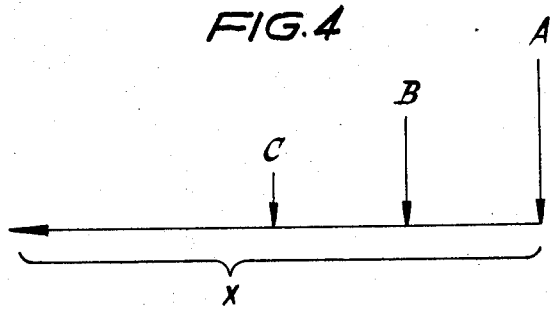
FIGS. 4, 5 and 6 are schematic mixture dosage diagrams for the treatment sections.

Two co-operating mixing or kneading members 2 and 2', provided within a housing 1 comprising a plurality of sections, are driven by a prime mover 3. The housing 1 has an inlet socket 4 at its end adjacent the prime mover 3. A proportioned dose of kneadable mixture A is charged in the direction of the arrow through the socket A, by means of a dosing apparatus (not shown).

Further charging sockets 5 or 6 are provided at a predetermined distance from the charging socket 4 on the housing 1. Further doses of kneadable mixture B and C are charged through the sockets 5 or 6 into the treatment sections within the housing 1. The charging sockets 5 and 6 are equipped with prime movers 5', 6' respectively for driving suitable proportioning screws or the like, so that an accurately determined quantity, i.e. an exact dose of kneadable mixture is charged into a particular treatment section; the mixture is processed by the kneading or mixing members 2 and 2', for example, kneaded and progressively conveyed to a discharge end 1' of the housing 1.

The size of the individual treatment sections, that is the distance from each charging socket to the adjacent socket or the final charging socket to the delivery end 1' of the housing may be arranged in accordance with a particular kneadable mixture to be treated or the temperature values applying to this mixture. In any case a given limit value of the temperature for charging a further batch of kneadable mixture and/or the quantity of this mixture is decisive, if the charging temperature has been established.

Of course the charging temperature of component A, B or C of mixture may be decisive for the magnitude of the dose.

An apparatus is shown in FIG. 2 which is also provided with charging sockets 4, 5 and 6 for charging individual components A, B and C of one or more kneadable mixtures; the charging sockets 5 and 6 have temperature gauges 7, 8 associated therewith which record the limit value of the temperature established in an individual treatment section in the housing 1 and in dependence upon this limit value and/or the charging temperature determined the given components B or C determine the magnitude of the dose. These steps thus ensure the most favourable temperature for the homogenisation or the maximum treatment of the mixture and, if necessary, also the quantity of this mixture.

The temperature gauges 7, 8 may of course also operate in dependence upon a cooling system (not shown) of the apparatus.

Figure 5:
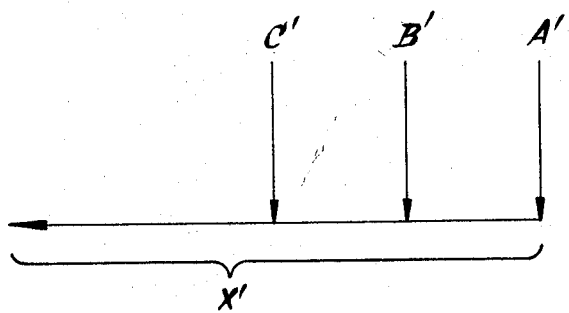
Figure 6:
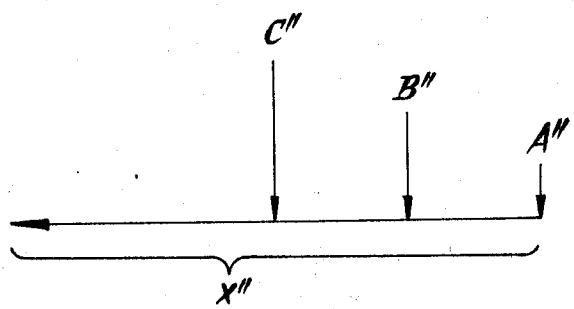

The amounts of the components A, B and C to be charged successively towards the delivery end 1' of the housing 1 into the individual treatment sections are shown in FIGS. 4, 5 and 6; these components may not only be variable but also they may be unequal with regard to their compositions or the proportion of their components requiring shearing forces.

A mixture component A (FIG. 4) is charged through the charging socket 4 which is the largest component of the mixture to be processed not only with regard to magnitude but also with respect to the proportion of the components requiring to be sheared. The subsequently charged mixture component B is smaller in quantity and the amount of shearing forces required are smaller. Finally, the component C is the smallest amount and requires the least amount of shearing force. If necessary, the component C may be larger in quantity than the quantity B but it must have less shearing force requirements.

A similar possibility is demonstrated in the diagram shown in FIG. 5; component A' having the largest quantity of of integers requiring shearing force, whilst an identically larger quantity of component B' having a smaller proportion of integers requiring shearing force and the component C' corresponding in quantity to components A' and B', has the smallest proportion of integers requiring shearing force.

Another charging alternative is shown in FIG. 6, in which the components A" is the smallest but has the largest portion of integers requiring shearing force, so that a suitable performance has to be produced to decompose these integers. To bring the mixture to the most favourable temperature for progressive treatment, a larger component B" is charged in the next treatment section, the proportion of integers requiring shearing force is smaller than in the component A". In this case the temperature of the mixture within the housing again drops in repetition of the previous cycle and, as a result of introducing energy for decomposing the components requiring shearing force, rises again until a given limit value is attained. At this point component C" is charged which is greater in quantity than component B", but has a smaller proportion of integers requiring shearing force.

The method described may, of course, be modified optionally, more especially in view of the mutually spaced relationship of the charging sockets and their arrangements. In the examples shown in FIGS. 1 and 2 of the drawings the charging sockets 5 and 6 are each turned through 180° relative to the charging sockets of FIGS. 4, 5 and 6 for the sake of clarity.

In a modification of the schemes shown in FIGS. 4 to 6 more than three charging sockets may be provided, when the overall length of the apparatus is suitable. In the same manner of course the magnitude of the individual dosages and the proportion of integers requiring shearing force within the individual components may be modified in various ways and adapted to certain mixtures and treatments.

We claim:
1. An apparatus for producing thermoplastic mixtures comprising a common housing having a prime mover disposed adjacent one end thereof and a discharge orifice for mixture at the other end thereof, a plurality of material component die charging sockets disposed along the housing and a treatment zone within said housing, at least two driven mixing members journalled for rotation within said housing, said sockets being provided with means for delivering propositioned doses of the components to said treatment zone, the spacing of said sockets from one another being dependent upon the final thermoplastic mixture required, at least one temperature gauge provided in each section, and the proportioned dose introduced to each treatment section being controlled by the temperature gauge of that section.

2. An apparatus for producing thermoplastic mixtures comprising a common housing having a prime mover disposed adjacent one end thereof and a discharge orifice for mixture at the other end thereof, a plurality of material component die charging sockets disposed along the housing and a treatment zone within said housing, at least two driven mixing members journalled for rotation within said housing, said sockets being provided with means for delivering propositioned doses of the components to said treatment zone, the spacing of said sockets from one another being dependent upon the final thermoplastic mixture required, at least one temperature gauge being provided in each section, and the proportioned dose introduced into an individual treatment section being controlled by the temperature gauge of a section nearer to the prime mover.

References Cited

UNITED STATES PATENTS

| | | | |
|---|---|---|---|
| 3,183,553 | 5/1965 | Slater | 259—9 X |
| 3,253,818 | 5/1966 | Seddon | 259—9 |

FOREIGN PATENTS 1,315,667  12/1962  France.

ROBERT W. JENKINS, *Primary Examiner.*